(12) United States Patent
Fischer et al.

(10) Patent No.: US 7,040,094 B2
(45) Date of Patent: May 9, 2006

(54) STAGED COMBUSTION WITH PISTON ENGINE AND TURBINE ENGINE SUPERCHARGER

(75) Inventors: Larry E. Fischer, Los Gatos, CA (US); Brian L. Anderson, Lodi, CA (US); Kevin C. O'Brien, San Ramon, CA (US)

(73) Assignee: The Regents of the University of California, Oakland, CA (US)

( * ) Notice: Subject to any disclaimer, the term of this patent is extended or adjusted under 35 U.S.C. 154(b) by 85 days.

(21) Appl. No.: 10/657,900

(22) Filed: Sep. 9, 2003

(65) Prior Publication Data

US 2004/0055298 A1    Mar. 25, 2004

Related U.S. Application Data

(60) Provisional application No. 60/412,420, filed on Sep. 20, 2002.

(51) Int. Cl.
  *F02B 33/44*  (2006.01)
  *F01B 29/04*  (2006.01)
  *F23C 5/00*   (2006.01)
  *F23M 3/00*   (2006.01)

(52) U.S. Cl. .................... 60/606; 60/605.2
(58) Field of Classification Search .......... 60/606, 60/274, 649, 712, 605.2; 123/585; 431/8, 431/9
See application file for complete search history.

(56) References Cited

U.S. PATENT DOCUMENTS

| | | | | | |
|---|---|---|---|---|---|
| 2,633,698 | A | * | 4/1953 | Nettel | 60/606 |
| 3,163,984 | A | * | 1/1965 | Dumont | 60/606 |
| 3,513,929 | A | * | 5/1970 | Kim | 60/712 |
| 3,775,971 | A | * | 12/1973 | Gadefelt | 60/606 |
| 4,009,574 | A | * | 3/1977 | Melchior | 60/606 |
| 4,026,115 | A | * | 5/1977 | Melchior et al. | 60/606 |
| 4,233,815 | A | | 11/1980 | Melchior | 60/606 |
| 4,250,711 | A | * | 2/1981 | Zehnder | 60/605.2 |
| 4,430,860 | A | * | 2/1984 | Melchior et al. | 60/606 |
| 4,496,306 | A | | 1/1985 | Okigami et al. | 431/8 |
| 4,517,802 | A | * | 5/1985 | Kobayashi et al. | 60/606 |
| 4,593,525 | A | | 6/1986 | Mezger | 60/606 |

(Continued)

FOREIGN PATENT DOCUMENTS

DE    3826600 A1    2/1990

(Continued)

OTHER PUBLICATIONS

Stark, A., "New power plant combustion model lowers pollutant emissions at affordable cost," EUREKALERT! Online, retrieved from the Internet: URL:www.eurekalert.org/pub_releases/2002-04/dinl-npp042902.php, Aug. 4, 2002 (as listed on International Search Report), Public Release date Apr. 29, 2002 (as printed document), 1 page.

*Primary Examiner*—Thai-Ba Trieu
(74) *Attorney, Agent, or Firm*—Eddie E. Scott; Alan H. Thompson

(57) ABSTRACT

A combustion engine method and system provides increased fuel efficiency and reduces polluting exhaust emissions by burning fuel in a two-stage combustion system. Fuel is combusted in a piston engine in a first stage producing piston engine exhaust gases. Fuel contained in the piston engine exhaust gases is combusted in a second stage turbine engine. Turbine engine exhaust gases are used to supercharge the piston engine.

8 Claims, 9 Drawing Sheets

U.S. PATENT DOCUMENTS

| | | | |
|---|---|---|---|
| 4,616,481 A | 10/1986 | Melchior et al. | 60/606 |
| 4,806,136 A | 2/1989 | Kiersz et al. | 62/646 |
| 5,029,442 A | 7/1991 | Nishiyama | 60/606 |
| 5,052,919 A | 10/1991 | Becker | |
| 5,327,725 A * | 7/1994 | Mitsubori | 60/605.2 |
| 5,350,293 A | 9/1994 | Khinkis et al. | 431/9 |
| 5,526,641 A | 6/1996 | Sekar et al. | 60/274 |
| 5,636,977 A | 6/1997 | Benson et al. | 431/8 |
| 5,649,517 A | 7/1997 | Poola et al. | 123/585 |
| 6,050,095 A * | 4/2000 | Blake | 60/605.2 |
| 6,089,855 A | 7/2000 | Becker et al. | 431/9 |
| 6,173,567 B1 | 1/2001 | Poola et al. | 123/585 |
| 6,301,889 B1 * | 10/2001 | Gladden et al. | 60/605.2 |
| 6,470,864 B1 * | 10/2002 | Kim et al. | 60/66 |
| 2003/0101725 A1 | 6/2003 | Marin et al. | 60/649 |
| 2003/0152879 A1 * | 8/2003 | Fischer et al. | 431/8 |

FOREIGN PATENT DOCUMENTS

| | | |
|---|---|---|
| WO | WO 92/06285 | 4/1992 |
| WO | WO 98/49438 | 11/1998 |
| WO | WO 98/51914 | 11/1998 |

* cited by examiner

STAGED COMBUSTION WITH PISTON ENGINE AND TURBINE ENGINE SUPERCHARGER

CROSS-REFERENCE TO RELATED APPLICATIONS

This application claims the benefit of U.S. Provisional Application No. 60/412,420 filed Sep. 20, 2002 and titled "Staged Combustion with Piston Engine and Turbine Engine Supercharger." U.S. Provisional Application No. 60/412,420 filed Sep. 20, 2002 and titled "Staged Combustion with Piston Engine and Turbine Engine Supercharger" is incorporated herein by this reference.

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to staged combustion and more particularly to staged combustion with piston engine and turbine engine supercharger.

2. State of Technology

International Patent Application No. WO 92/06285 to Russell A. Stanley, published Apr. 16, 1992 provides the following state of technology information, "As reliance upon the internal combustion engine grows in our modern society, several driving factors have led to the demand for changes in the design and operation of such engines. As the available fuel supply slowly decreases, it is an objective of internal combustion engine design to provide for improved fuel consumption and economy while not adversely impacting the desired performance of such engines. Alternatively, increasing demands to satisfy environmental concerns associated with such engines have led to the need for providing complex systems to reduce emissions of noxious gases such as unburned hydrocarbons and nitrous oxides formed in the combustion process of internal combustion engines. These objectives in the design of internal combustion engines create conflicting design problems to a great extent as used to reduce emissions of noxious gases have tended to increase fuel consumption and vice versa."

International Patent Application No. WO 98/49438 to Westinghouse Electric Corporation, published Nov. 5, 1998, provides the following state of technology information, "Numerous approaches for improving the thermal performance of combustion turbine power generation systems have been proposed since the early 1950s when combustion turbines were first applied for stationary power generation. Alternative approaches range from advanced toping and bottoming cycles, to advanced turbine firing conditions. Some of these approaches have been put into practice to reach the current level of performance that combustion turbine power generation has evolved to today.

The prevalent factor enhancing performance has been increases in firing conditions (temperatures and pressures) through advances in airfoil design, materials and cooling methods. Cycle variations are also being developed to improve system performance in contrast to hardware improvements, such as evaporative cooling cycles, recuperative cycles, intercooled cycles, humid air cycles, reheat cycles, advanced bottoming cycles, and elevated steam bottoming conditions. Many proposed approaches for advanced combustion turbine power cycles have been rejected as being unworkable or uneconomical, and some have not yet been developed sufficiently to be verified, demonstrated and commercialized. Therefore, a need exists for new, viable approaches for improved power generation."

U.S. Pat. No. 6,089,855 issued Jul. 18, 2000 to Frederick E. Becker et al and assigned to Thermo Power Corporation, provides the following state of technology information, "The market for industrial combustion equipment in the United States is shaped in large part by federal regulations governing air standards in urban areas, as mandated by the Clean Air Act (CAA), as amended. Industrial expansion can be limited in areas that do not meet National Ambient Air Quality Standards (NAAQS) for the emissions of certain combustion gases, such as $NO_2$. New sources of NOx in non-attainment areas must use emission offsets and a tight level of control known as "lowest achievable emission rate (LAER)." A target NOx emission no greater than 9 ppmvd (parts per million by volume on a dry basis with 3% $O_2$ in the emission) is usually established for new sources in non-attainment areas. The Clean Air Act also sets standards for ambient ozone in non-attainment areas and in other areas called "ozone transport regions," which meet the standard but into which ozone can migrate. New sources in some of the ozone non-attainment areas will be subject to the same LAER NOx target levels. The 1990 amendments to the CAA affects smaller sources than previous regulations and consequently will impact industrial scale furnaces and boilers directly. The usual method to reduce NOx emissions to meet the LAER standards is to post-process exhaust gases employing selective catalytic reduction."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a combustion engine method and system. In one embodiment the present invention provides a combustion engine apparatus comprising a first stage piston engine, fuel, means for combusting the fuel in the a first stage piston engine in a first stage producing piston engine exhaust gases with the piston engine exhaust gases containing the fuel, a second stage turbine engine operatively connected to the first stage piston engine, means for combusting the fuel contained in the piston engine exhaust gases in the second stage turbine engine producing turbine engine exhaust gases; and means for supercharge the first stage piston engine using the turbine engine exhaust gases. Various embodiments of the present invention provide a combustion engine method and system with one or more benefits including increased boost pressure, increased mean operating pressure, increased power density, increased fuel efficiency and reduced polluting exhaust emissions.

In one embodiment the present invention provides a combustion engine method with increased fuel efficiency and reduced polluting exhaust emissions by burning fuel in two stages comprising the steps of combusting the fuel in a piston engine in a first stage, the step of combusting the fuel in a piston engine in a first stage producing piston engine exhaust gases, the piston engine exhaust gases containing the fuel, combusting the fuel contained in the piston engine exhaust gases in a second stage turbine engine, the step of combusting the fuel contained in the piston engine exhaust gases in a second stage turbine engine producing turbine engine exhaust gases and using the turbine engine exhaust gases to supercharge the piston engine.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
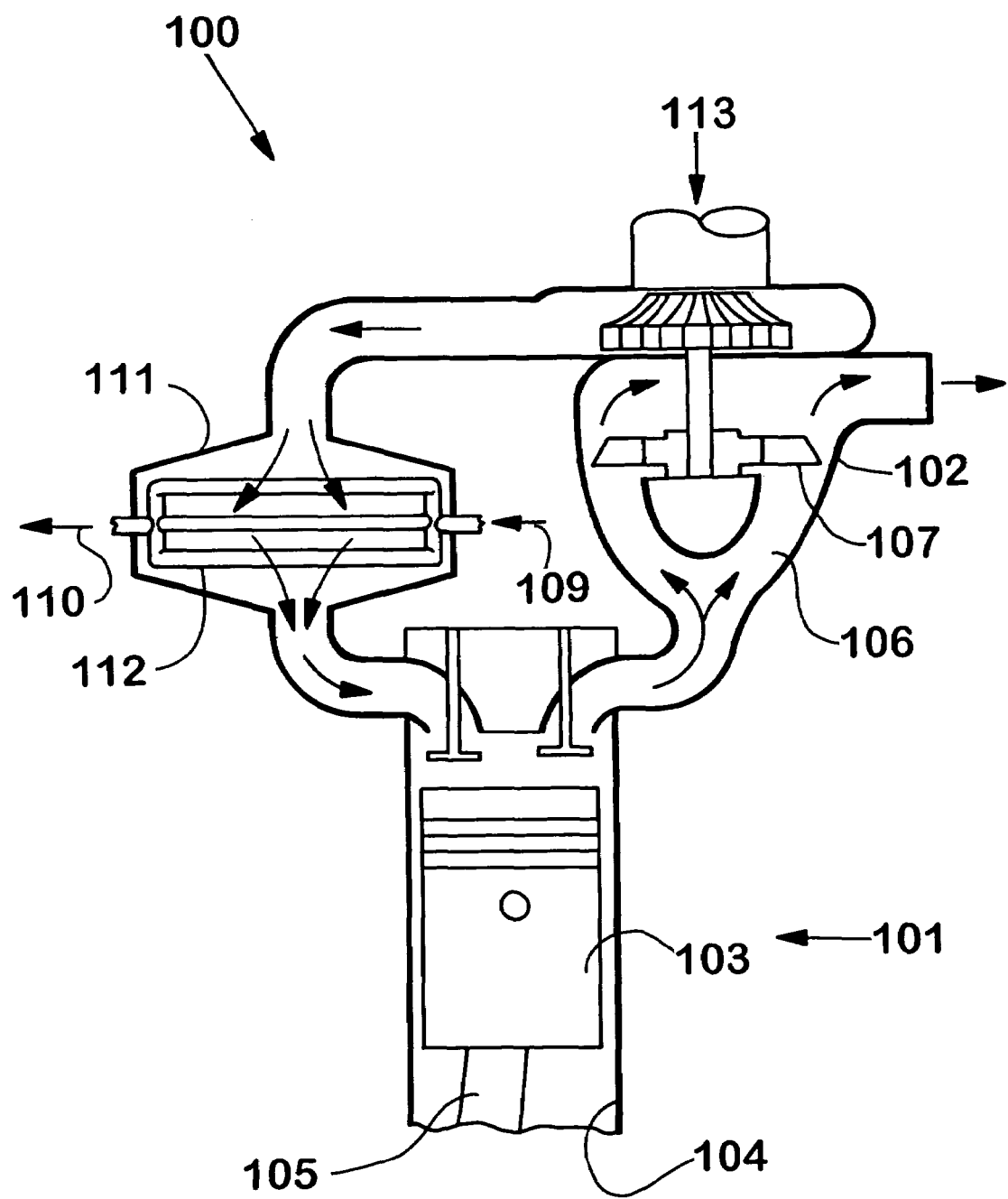
FIG. 1 illustrates a system for increasing engine efficiency.

Referring now to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Referring now to FIG. 1, a system for increasing engine efficiency is illustrated. The system provides a turbo supercharged reciprocating diesel engine. The turbo supercharged reciprocating diesel engine is designated generally by the reference numeral 100. The engine section 101 includes a piston 103 in a piston chamber 104 driven by a piston rod 105. The exhaust gases 106 from the engine section 101 are provided to the turbine 102. The turbine 102 includes a turbine blade 107. An air intake 108 is driven by the turbine 102. The air is directed through an intercooler 111 that includes cooling tubes 112 with water 109 directed to the cooling tubes and a water outlet 110.

The exhaust gases from the reciprocating engine section 101 are used to drive a turbine that is used to compress the air before it goes into the combustion chamber. Turbocharging increases the operating pressure and mass flow in the engine resulting in higher power for a specific engine volume. Turbo charging is not usually done in a spark ignition engine because engine knock occurs with increased pressure and density. Turbo-charging is frequently done with compression ignition or diesel engines to increase performance. Although turbo-charging can increase engine performance, it does not reduce pollution in the exhaust gases. During normal or cruising operations combustion engines operate fuel lean or with excess air to control polluting exhaust emissions.

Figure 2:
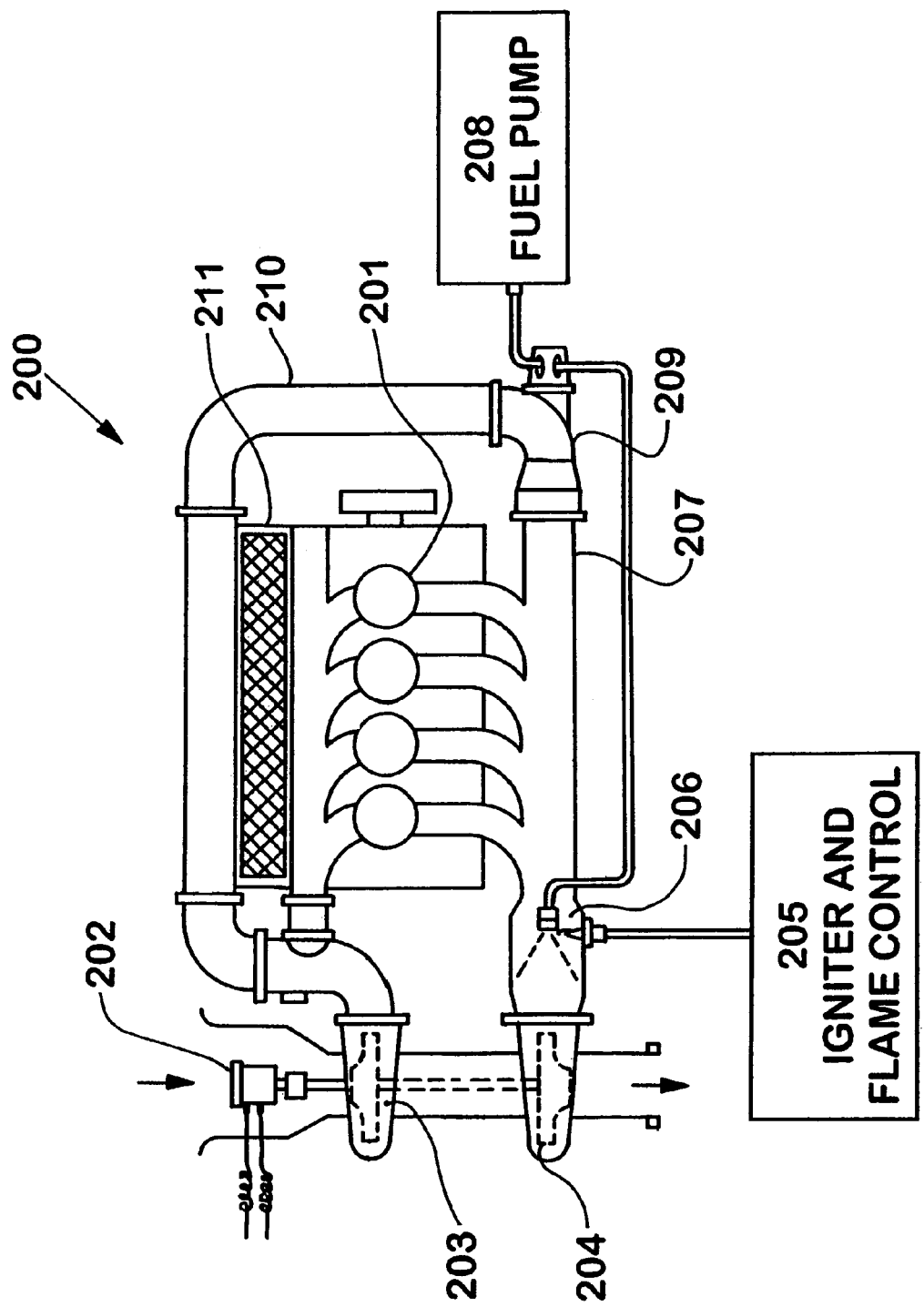
FIG. 2 illustrates a free wheeling turbine engine.

Referring now to FIG. 2, a free wheeling turbine engine is illustrated. The free wheeling turbine engine is designated generally by the reference numeral 200. The free wheeling turbine engine 200 includes diesel and cylinders 201, turbocompressor starter 202, compressor 203, turbine 204, igniter and flame control 205, combustion chamber 206, exhaust manifold 207, fuel pump 208, regulator 209, by-pass 210, and preheating system 211. The power output of a diesel engine can be increased using the Hyperbar diesel concept where the conventional turbo-charger is effectively replaced by a free wheeling turbine engine. The freewheeling turbine engine can add energy to the diesel engine exhaust gases to allow higher boost pressures without excessive pumping losses. A bypass valve is used to operate the turbine separately to start the diesel engine. The diesel and turbine engines operate fuel lean to control polluting exhaust emissions.

Figure 3:
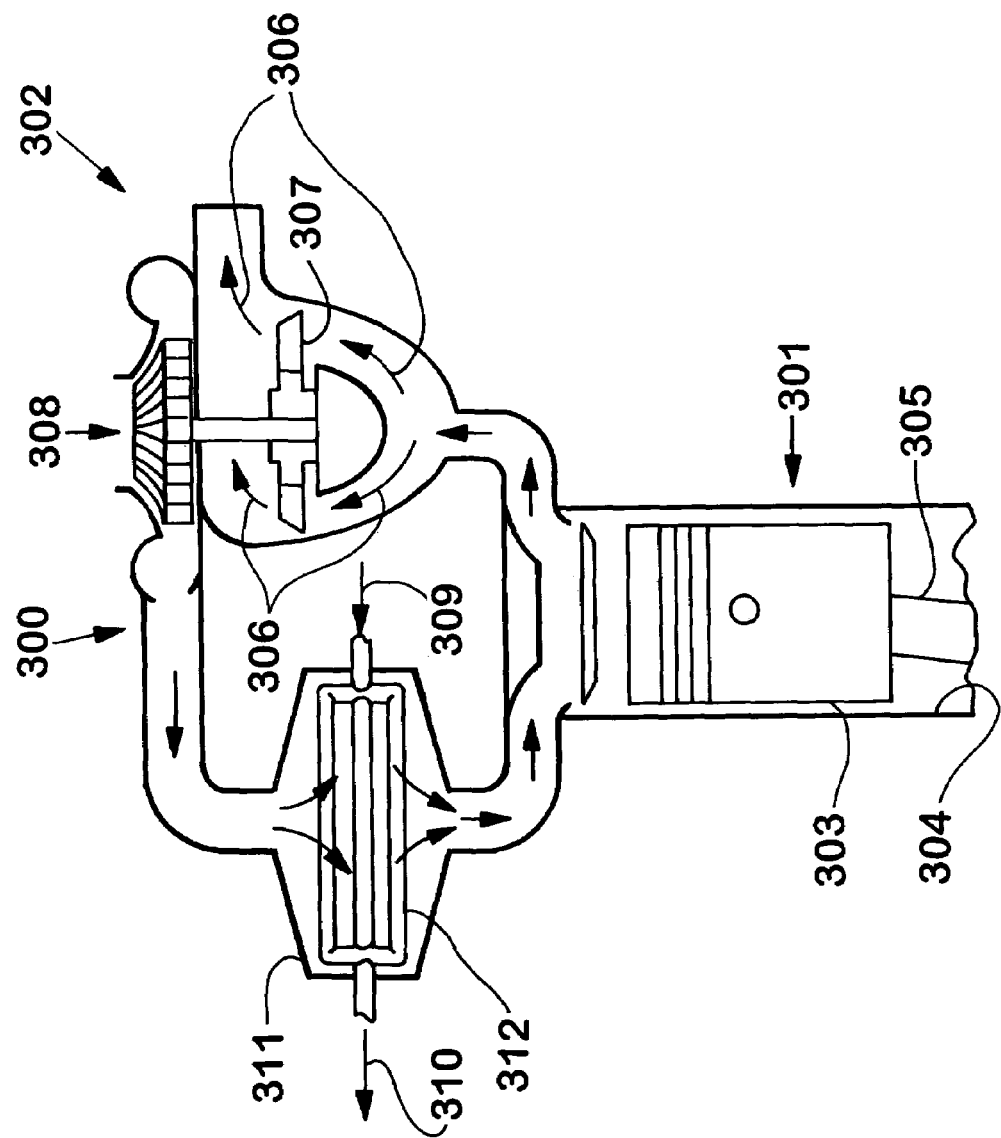
FIG. 3 illustrates two-staged combustion where the primary combustion is in piston engine and the secondary combustion is in a turbine engine.

Referring now to FIG. 3, a combustion engine method and system that provides increased fuel efficiency and reduces polluting exhaust emissions by burning fuel in a two stage combustion system is illustrated. The combustion engine method and system is designated generally by the reference numeral 300. The method and system 300 provides a turbine engine supercharger and a piston engine to reduce pollution while increasing or maintaining overall system performance and efficiency. The piston engine operates fuel rich where most of the heat of combustion is released. The piston engine's exhaust gases have sufficient fuel remaining for a second burn in a turbine engine supercharger. Part of the energy from the piston engine combustion gases is used to perform work. The cooled combustion gases from the piston engine are reheated by the second combustion at or near stoichiometric conditions in the turbine combustion chamber. Energy is extracted using a turbine to supercharge the piston engine and to compress the air for the turbine engine. Nitrogen enriched air can be used instead of air to further control the combustion temperature and products. The air is enriched with nitrogen using air separation technologies such as diffusion, permeable membrane, absorption, and cryogenics. The method and system 300 has uses in the replacement and/or modification of current piston engines to reduce pollutants while maintaining relatively high combustion and thermal efficiencies.

Increasing fuel efficiency in combustion engines while simultaneously reducing polluting exhaust emissions has been researched over the past 25 years and subsidized by the Federal Government. Maximum fuel efficiency normally occurs at or near stoichiometric conditions where the fuel is completely oxidized. In practice the combustion process in an engine is usually with air and not with pure oxygen.

When oxygen is supplied by dry air, 3.76 moles of nitrogen will accompany one mole of oxygen. The stoichiometric air-fuel ratio is the ratio of the mass of air to the mass of fuel to result in stochiometric combustion. The actual operating condition of an engine is usually expressed in terms of the equivalence ratio which is the ratio of the stoichiometric air-fuel ratio to the actual air-fuel ratio. The equivalence ratio is 1.0 when the engine is operating at stoichiometric conditions. When an engine operates at an equivalence ratio greater than 1.0 it is operating fuel rich and produces pollutants such as hydrocarbons (HC), carbon monoxide (CO) and particulate matter. At equivalence ratios less than 1.0 the engine produces oxides of nitrogen (NOx) which is major source or photochemical smog and is regulated. Also the combustion gases can be very corrosive with the excess oxygen and reduce the life of the engine.

Past research developed efficient engines by operating with equivalence ratios less than one, but will not meet impending requirements for greatly reduced NOx. Current research includes the development or modification of engines such as Variable Compression, Hyperbar Diesel, Homogenous Charged Compression Ignition HCCI, and nitrogen enriched air combustion. Emissions can also be reduced using catalytic converters for spark-ignited engines or using the Plasma-Assisted Catalytic Reduction (PACER) process for lean-burn engines.

By increasing the combustion temperature and pressure, the efficiency of a combustion system can usually be increased. The efficiency of the Brayton cycle generally increases with temperature and pressure, but can decrease with pressure when the temperature is too low. Hence it is important to operate at the highest temperature as possible to obtain high efficiency. The maximum operational temperature of most combustion systems, especially continuous flow ones, is limited by the materials of construction and the corrosive and oxidative products of combustion. In general higher operational temperatures decrease the materials physical properties (e g., strength) and increase corrosion and oxidation of the material.

Typically gas turbines operate with excess air (phi=0.4–0.7) to reduce the operational temperature but produces large amounts of corrosive and oxidative gases. A two-staged turbine can be used to reduce the corrosive and oxidative gases by burning fuel rich in the first stage and stoichiometrically in the second stage. However, in order to obtain acceptable combustion temperatures in the first stage the fuel ratio tends to be excessively high which can result in soot formation and fouling. Another approach to reduce the combustion temperature is to use nitrogen augmentation or enriched air.

Air separation technologies are used to enrich nitrogen in air up to 100%. To obtain reasonably high efficiency the fuel and nitrogen-enriched air are combusted at stoichiometric conditions that require relatively large amounts of highly enriched nitrogen oxidant.

Referring again to FIG. 3, the combustion engine system 300 will be described in greater detail. The combustion engine system 300 provides increased fuel efficiency and reduces polluting exhaust emissions by burning fuel in a two stages. A first stage piston engine 301 is provided for combusting the fuel in a first stage. The first stage piston engine 301 can be a compression ignition engine, a homogenous charged compression ignition engine, a variable compression engine, a nitrogen enriched air combustion engine, a rotating engine, a linear engine, and/or a reciprocating engine. The first stage piston engine 301 produces piston engine exhaust gases and said piston engine exhaust gases containing said fuel. A second stage turbine engine 302 is provided for combusting the fuel contained in the piston engine exhaust gases in a second stage. The second stage turbine engine produces turbine engine exhaust gases. A supercharger is provided for supercharge the piston engine using the turbine engine exhaust gases.

The first stage piston engine 301 can be a compression ignition engine, a homogenous charged compression ignition engine, a variable compression engine, a nitrogen enriched air combustion engine, a rotating engine, a linear engine, and/or a reciprocating engine. The fuel can be oil, methane, natural gas, ammonia, alcohols and/or ethers. The fuel in other embodiments can be any combustible matter. Examples are, fossil fuels including oil, natural gas, and/or coal; inorganic fuels including ammonia, hydrazine, and/or calcium; and organic fuels including alcohols, ethers, and/or wood. A compressor provides compressed air to the second stage turbine engine for combusting the fuel contained in said piston engine exhaust gases.

The piston engine 301 includes a piston 303 in a piston chamber 304 driven by a piston rod 305. The exhaust gases 306 from the piston engine are provided to the turbine engine 302. The turbine engine 302 includes a turbine 307 and an air intake 308. The exhaust gases 306 from the turbine 307 are used to compress the air before it goes into the piston engine 301. The compressed air is directed through an intercooler 311 that includes cooling tubes 312 with water 309 directed to the cooling tubes and a water outlet 310. Turbo-charging increases the operating pressure and mass flow in the engine resulting in higher power for a specific engine volume. Turbo charging is not usually done in a spark ignition engine because engine knock occurs with increased pressure and density. Turbo-charging is frequently done with compression ignition or diesel engines to increase performance. Although turbo-charging can increase engine performance, it does not reduce pollution in the exhaust gases.

The combustion engine method and system 300 provides a combustion method that uses two-staged combustion where the primary combustion is in piston engine (e.g., spark ignition (SI), compression ignition (CI) engine and homogenous charged compression ignition (HCCI)) and the secondary combustion is in a turbine engine. The primary and secondary combustion can use air or nitrogen enriched air for the oxidizer in the combustion process.

Figure 4:
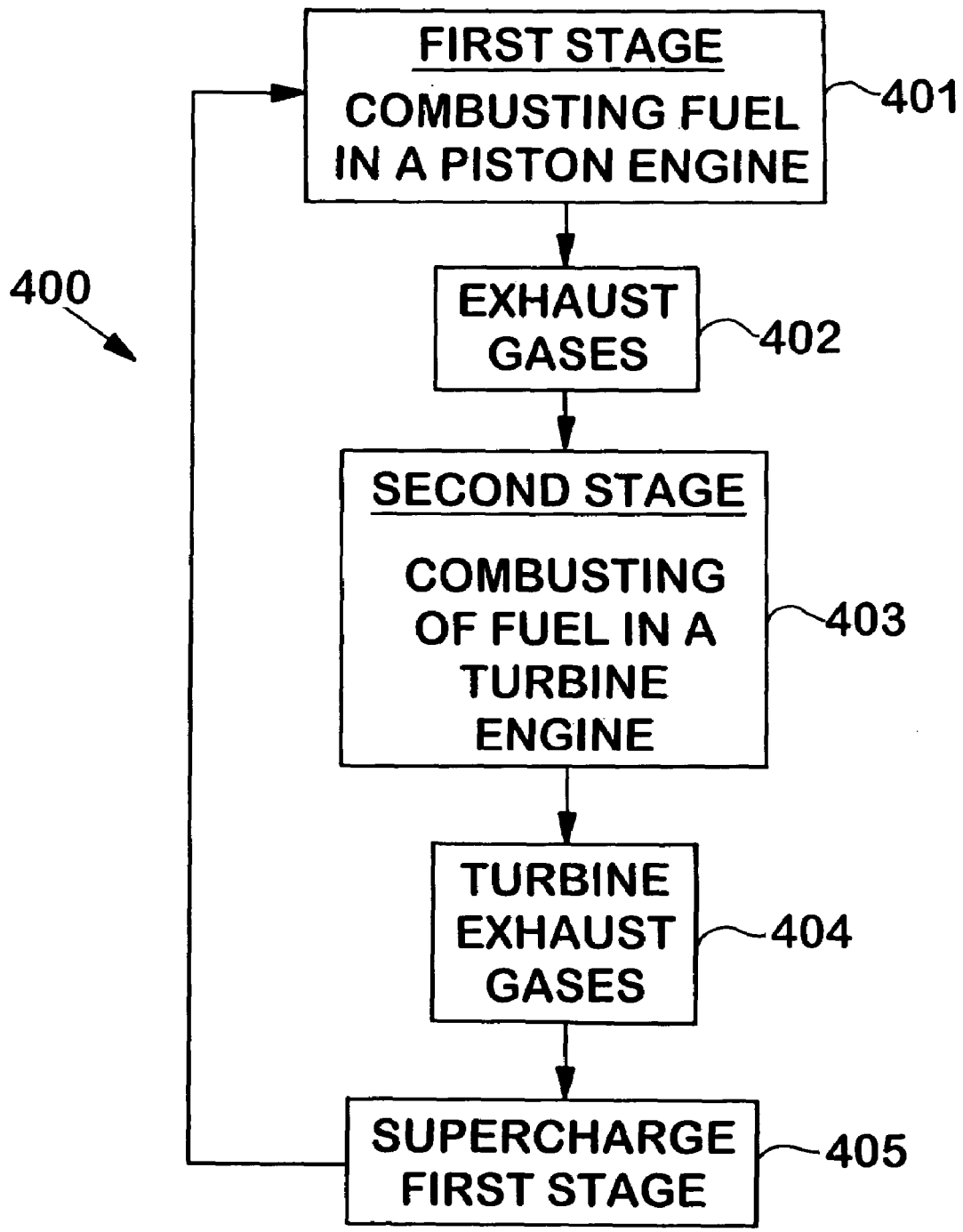
FIG. 4 is a simplified flow diagram illustrating the present invention.

Referring now to FIG. 4, a simplified flow diagram illustrates combustion engine method that provides increased fuel efficiency and reduces polluting exhaust emissions by burning fuel in a two-stage combustion system. The combustion engine method is designated generally by the reference numeral 400. The combustion engine method 100 comprises the steps of combusting the fuel in a piston engine in a first stage 401. The step of combusting the fuel in a piston engine in a first stage 101 produces piston engine exhaust gases 402. The piston engine exhaust gases 402 contain fuel. The step of combusting the fuel contained in the piston engine exhaust gases in a second stage turbine engine 402 produces turbine engine exhaust gases 404. The turbine engine exhaust gases 404 are used to supercharge 405 the first stage piston engine.

The first stage piston engine can be a compression ignition engine, a homogenous charged compression ignition engine, a variable compression engine, a nitrogen enriched air combustion engine, a rotating engine, a linear engine, and/or a reciprocating engine. The fuel can be oil, methane, natural gas, ammonia, alcohols and/or ethers. The fuel in other embodiments can be any combustible matter.

Examples are, fossil fuels including oil, natural gas, and/or coal; inorganic fuels including ammonia, hydrazine, and/or calcium; and organic fuels including alcohols, ethers, and/or wood. A compressor provides compressed air to the second stage turbine engine for combusting the fuel contained in the piston engine exhaust gases.

The piston engine operates fuel rich thereby producing a reducing atmosphere and suppressing the formation of NOx. Most of the fuel is burned in the piston engine but the piston engine exhaust gases are sufficiently fuel rich for a second burn in the turbine engine. The piston engine in one embodiment is a compression ignition engine that has heterogeneous combustion resulting in the fuel in the piston engine exhaust gases being near stoichiometric conditions or slightly fuel rich. The step of combusting the fuel contained in the piston engine exhaust gases in a second stage turbine engine occurs near stoichiometric or slightly fuel lean conditions at reduced combustion temperatures where NOx formation rate is low.

The turbine engine exhaust gases supercharge the piston engine. Compressed air is delivered to the turbine engine for the step of combusting the fuel contained in the piston engine exhaust gases in a second stage turbine engine. The residence time of combusting the fuel contained in the piston engine exhaust gases in the turbine engine is increased to ensure that all hydrocarbons and particles are burned. The step of combusting the fuel contained in the piston engine exhaust gases in a second stage turbine engine stage is combusted with an oxidizer stream. The oxidizer stream in one embodiment is air. The oxidizer stream in one embodiment is nitrogen-enriched air. The nitrogen-enriched air in one embodiment is produced using air separation technologies. The air separation technologies can include cryogenic, absorption, diffusion and/or permeation.

The steps of combusting in the combustion engine method 100 takes place to perform work. In one embodiment the steps of combusting takes place to provide heat. The heat can be used for a furnace, for a boiler, for a smelter, and/or for an Otto engine. In one embodiment the piston engine is a compression ignition engine and excess air that is added in the turbine engine is increased to ensure that all hydrocarbons and particles are burned. In one embodiment the piston engine is a spark ignition engine that is operated fuel rich to suppress engine knock. In one embodiment the step of combusting the fuel in a piston engine in a first stage is combusted with an oxidizer stream. The oxidizer stream can be nitrogen enriched air.

Figure 5:
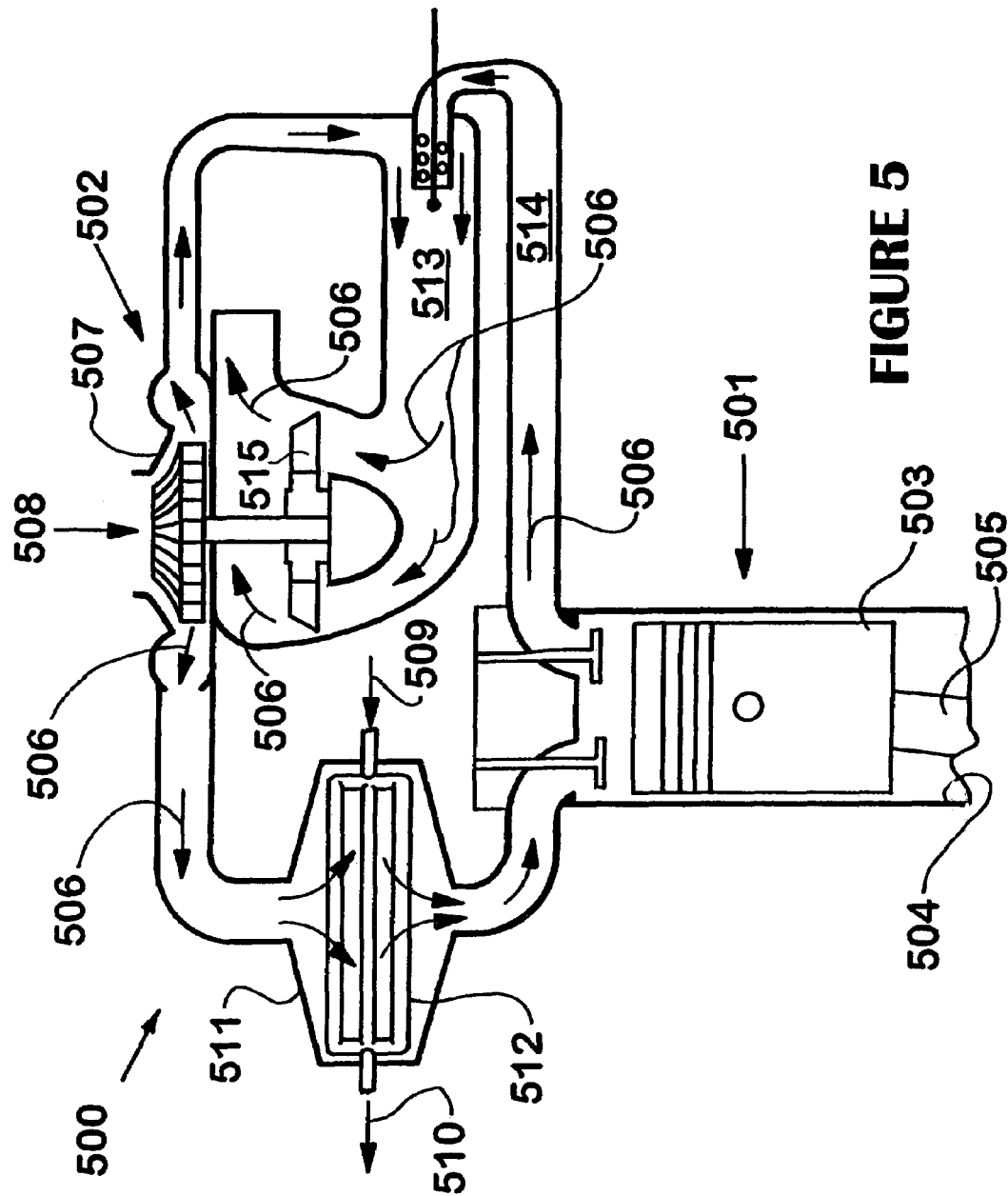
FIG. 5 shows a turbine engine supercharger combined with a reciprocating SI or CI engine.

Referring now to FIG. 5, another embodiment of a combustion method and system is illustrated with a turbine engine supercharger combined with a reciprocating SI or CI engine. This embodiment is designated generally by the reference numeral 500. The piston engine 501 includes a piston 503 in a piston chamber 504 driven by a piston rod 505. The exhaust gases 506 from the piston engine are provided to the turbine engine 502. The turbine engine 502 includes a turbine 515 and an air intake 508. The exhaust gases 506 from the turbine 515 are used to compress the air before it goes into the piston engine 501. Fuel rich exhaust 514 is directed into combustion chamber 513. The exhaust gases 506 are directed through an intercooler 511 that includes cooling tubes 512 with water 509 directed to the cooling tubes and a water outlet 510. Turbo-charging increases the operating pressure and mass flow in the engine resulting in higher power for a specific engine volume. Turbo charging is not usually done in a spark ignition engine because engine knock occurs with increased pressure and density. Turbo-charging is frequently done with compression ignition or diesel engines to increase performance. Although turbo-charging can increase engine performance, it does not reduce pollution in the exhaust gases.

The primary combustion occurs in the reciprocating engine and is fuel rich, that is, at an equivalence ratio greater that 1.0 to provide a reducing atmosphere to reduce or eliminate NOx formation. The primary combustion exhaust gases will have fuel molecules such as CO and H2 in sufficient amounts such that they can be burned in the combustion chamber of the turbine engine. The secondary combustion occurs at or near stoichiometric conditions at a lower combustion temperature where NOx is difficult to form. The burned gases from the secondary combustion drive a turbine that in turn drives a compressor that supercharges the piston engine and provides compressed air for the secondary combustion. Nitrogen enriched air can be used in the primary or secondary combustion process to better control the combustion temperature and products.

Two-stage combustion with a CI engine can be used to significantly reduce HCs and particles in the a-exhaust with the second burn in the turbine combustion chamber. The residence time in the turbine combustion chamber can be increased and excess air can be added to ensure that all of the HC and particles are burned.

The embodiment 500 results in lower pollutant emissions, lower corrosion rates of combustion and heat-transfer equipment, and compatible or improved efficiencies as compared to the typical combustion process used in boilers, burners, turbines, and internal combustion engines. The embodiment 500 involves burning the fuel in two or more stages, where the fuel is combusted fuel-rich with nitrogen-enriched air in the first stage, and the fuel remaining after the first combustion stage is combusted in the remaining stage(s) with air or nitrogen-enriched air. All the combustion stages except the last have a slightly rich fuel/oxidant mixture, and the last stage has the stoichometric (or near stoichometric) fuel/oxidant mixture. The optimum nitrogen concentration range for the nitrogen-enriched air is about 85–89% nitrogen (molar percent), and is adjusted to achieve the desired combustion temperature and reduced corrosion and pollutant levels. This method of burning fuel substantially reduces the oxidant loading (i.e., $O_2$ and O) and pollutant loading (i.e., NO and CO) in the effluent gas, and is applicable to many types of combustion equipment, including: boilers, burners, turbines, internal combustion engines, and many types of fuel including hydrogen and carbon-based fuels. This method of burning fuel, is termed "Staged Combustion with Nitrogen-Enriched Air" or SCNEA.

SCNEA, involves burning fuel in two or more stages in a combustion system, where the fuel is combusted fuel-rich with nitrogen-enriched air in the first stage, and then the fuel remaining after the first combustion stage is burned in the remaining stage(s) with air or nitrogen-enriched air. All the combustion stages, except the last have a slightly rich fuel/oxidant mixture, and the last stage has a stoichiometric (or near stoichiometric) fuel/oxidant mixture. Following each combustion stage, part of the energy from the combustion gases is used to perform work or to provide heat. The equivalency ratio for the first stage of combustion and the nitrogen-enriched air are adjusted to achieve the desired combustion temperature and reduced corrosion and pollutant levels. The equivalency ratio and nitrogen enrichment concentration ranges are respectively typically, phi=1.1–1.5 and 83–88%. This method of burning fuel substantially reduces the oxidant (i.e., $O_2$ and O) and pollutant levels (i.e., NO and CO) in the effluent and, thus, allow higher operational temperatures to maintain or increase the thermal efficiency. This combustion method is applicable to many types of combustion systems, including boilers, burners, turbines, internal combustion engines, and many types of fuel including hydrogen and carbon-based fuels.

Application of SCNEA to a two-stage gas turbine combustion system can be summarized. First, air is enriched in nitrogen using air separation technology and then compressed in a water-cooled compressor to 30 atmospheres. The nitrogen enriched air enters the first stage combustion chamber where it is mixed with fuel and burns fuel rich. The combustion gases exit the combustion chamber and enters a turbine at the combustion temperature of 1700K and the pressure of 30 atmospheres. Work is performed in the turbine by expansion of the gases to a temperature of 780 k and a pressure of 2 atmospheres. The cooled combustion gases enter the second stage where nitrogen-enriched air or air is added to burn the remaining fuel in the second stage. The nitrogen-enriched air or air is supplied by a compressor and heated in a heat exchanger by the second stage exhaust gases.

In a two-stage turbine cycle, the first compressor feed consists of nitrogen-enriched air mixed with the fuel (methane for our example) at 350K and a pressure of one atmosphere. The first compressor compresses the gas mixture to the desired pressure (this compression increases the gas temperature). The mixture is then combusted at a constant pressure. Nitrogen-enriched air is used as the oxidant stream in the first combustion stage to allow precise control of the combustion temperature (and correspondingly the pollutant generation) while producing effluent gases that have a very low oxidant loading. The combustion products at high temperature and an elevated pressure ace expanded to 2.0 atmospheres and work is extracted (this expansion results in a lowering of the gas temperature). Since the first combustion stage is operated fuel-rich (~>1), there is enough fuel remaining in the effluent from the first combustion stage to be flammable when mixed with a stoichometric amount of air (or nitrogen-enriched air). This mixture is combusted at a constant pressure, of 2.0 atmospheres in the second combustion stage. The temperature of the second combustion stage is maintained below the temperature of the first combustion stage by controlling the amount of fuel remaining after the first combustion stage. The effluent from the second combustion stage is then expanded to 1.0 atmospheres and work its again extracted.

The thermodynamic cycle of compression-combustion-expansion is the Brayton cycle. For the ideal Brayton cycle, the compression and expansion (turbine) stages are assumed to be adiabatic and isentropic, and the combustion stage is assumed to be isobaric. The efficiency of the Brayton cycle can be increased sometimes by increasing the maximum pressure. However, if the temperature is too low, an increase in pressure can result in a decrease in efficiency.

If the compression ratio is above 15 the temperature should be at least 1400K. The low oxidant loading in the effluent when using the SCNEA method allows both higher temperatures and higher pressures without increasing corrosion rates over those of typical combustion facilities. These allowable increases in temperature and pressure, when using the SCNEA method, lead to higher Brayton cycle efficiencies.

First Compression—The nitrogen-enriched air and methane mixture is input to the compressor at 300K and 1.0 atmosphere. The compressor increases the pressure of the gas mixture to 30 atmospheres, and because the compressor is assumes to be water-cooled, the compressed gas is assumed to exit the compressor at a temperature of 350K.

First Combustion Stage—The methane and nitrogen-enriched air mixture at 30 atmospheres and 350K is input to the first combustion chamber where most of the methane is burned and the temperature is increased to 1700K.

The relative amount of fuel and air in the combustion mixture is described by $\phi$, the ratio of mass fuel to mass air divided by the ratio of mass fuel to mass air for a stoichometric mixture [i.e., (Mass Fuel/Mass Air)/(Mass Fuel/Mass Air)$_2$]. For $\phi>1$ the mixture is fuel-rich and for $\phi<1$ the mixture is fuel-lean.

It is important to ensure that the gas mixture anticipated for the first combustion stage is flammable. Two-staged combustion with a SI engine can be used to suppress engine knock by increasing the ignition delay.

Figure 6:
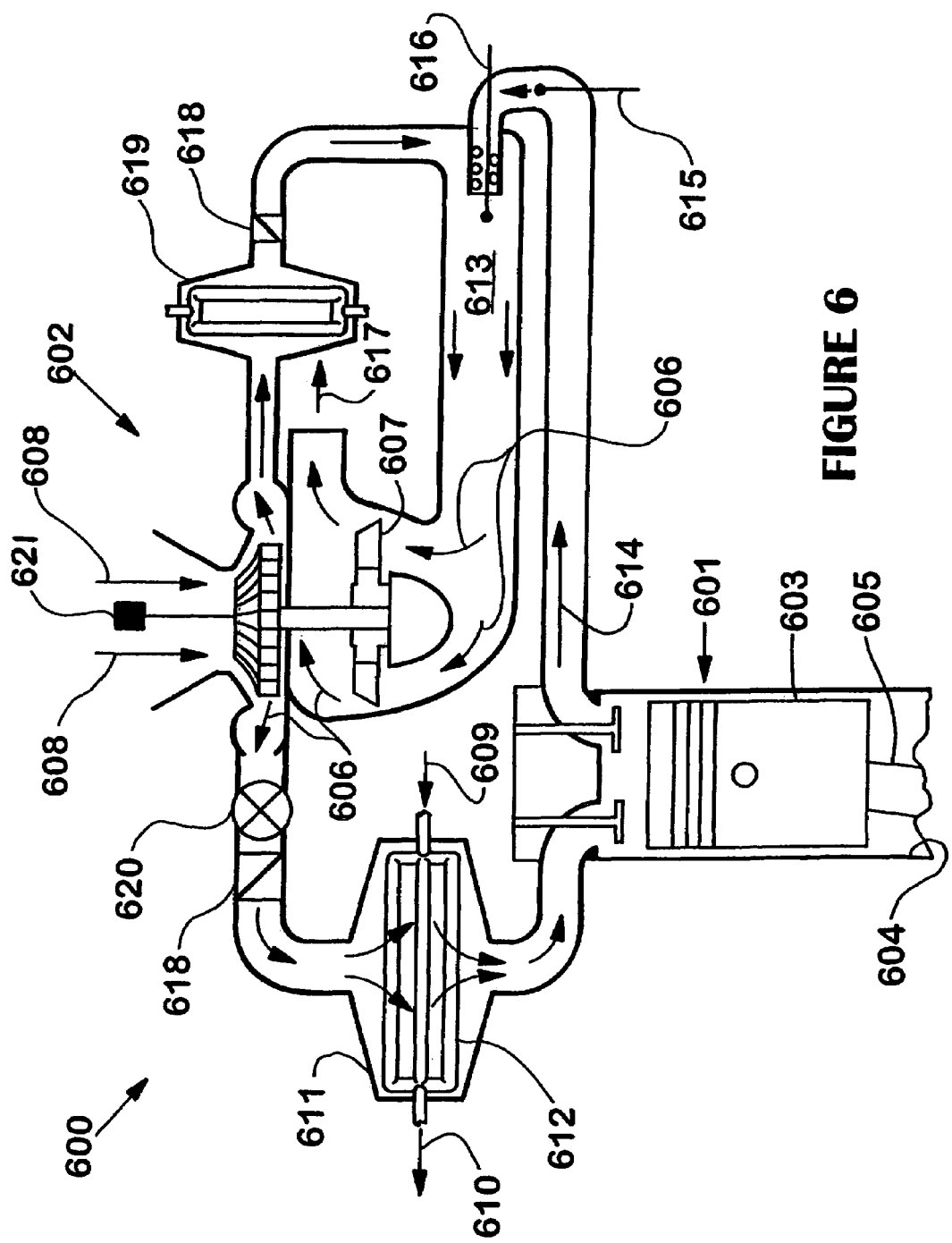
FIG. 6 shows a turbine engine supercharged reciprocating engine with SCNEA, bypass valve, turbine engine starter, and fuel injector.

Referring now to FIG. 6, another embodiment of a combustion method and system is illustrated with a turbine engine supercharger combined with a reciprocating SI or CI engine. This embodiment is designated generally by the reference numeral 600. The piston engine 601 includes a piston 603 in a piston chamber 604 driven by a piston rod 605. The exhaust gases 606 from the piston engine are provided to the turbine engine 602. The turbine engine 602 includes a turbine 607 and an air intake 608. The exhaust gases 606 from the turbine 607 are used to compress the air before it goes into the piston engine 601. Fuel rich exhaust 614 is directed into combustion chamber 613. The compressed air directed is through an intercooler 611 that includes cooling tubes 612 with water 609 directed to the cooling tubes and a water outlet 610. Referring to FIG, 6 a bypass valve is placed in front of the piston engine. During start up the valve is closed and the piston engine is bypassed. A starter to the turbine engine is turned on to turn the compressor that compresses air that flows to the turbine combustion chamber. The fuel injector injects fuel into the turbine combustion camber and the igniter is turned on to combust the fuel and air. Once the turbine is operating to the appropriate level, the piston engine bypass valve is opened to start the piston engine. Air separation units with air coolers can be used to supply nitrogen-enriched air to either or both the piston and turbine engines. The bypass valve can be adjusted to divert extra air to the turbine engine where fuel is injected to assist faster acceleration. A fuel injector 615 adds fuel to the fuel rich exhaust. An igniter/flame control unit 616 maintains the ignition in the combustion chamber 613. The exhaust has low $NO_2$, HCl, CO. An intercooler 619 and air separation unit 618 is connected to the turbine engine 602. A turbine engine starter 621 is connected to the turbine engine 602.

Figure 7:
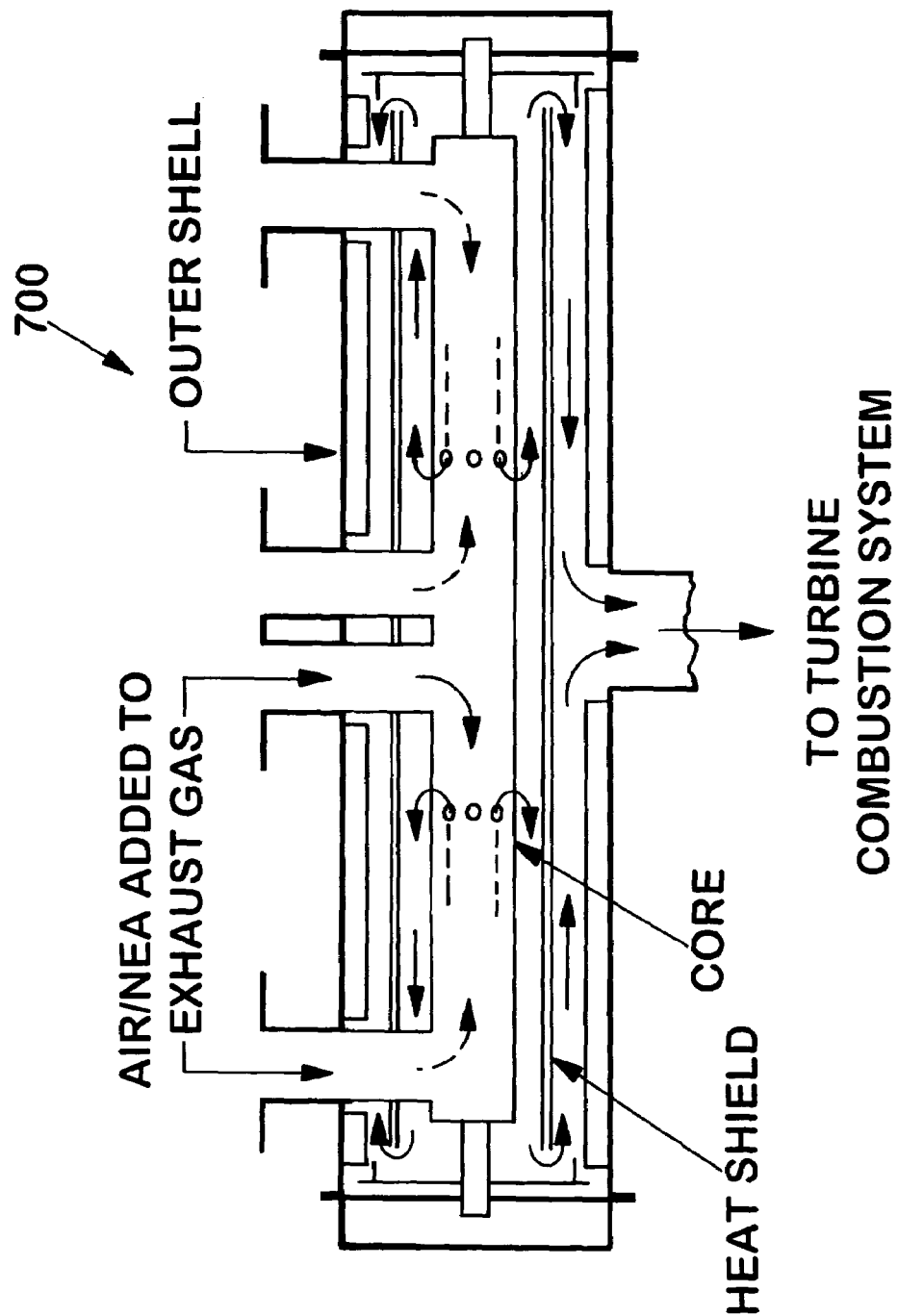
FIG. 7 shows a mixing unit for diesel fuel rich exhaust gas and air/NEA.

Referring to FIG. 7, a mixing unit 700 can be added between the piston engine and turbine engine. The mixing unit 700 is used to promote mixing of the piston engine fuel rich hot exhaust gases with air/NEA. The mixing process makes a well-stirred fuel and oxidizer mixture to improve the combustion process in the turbine combustion chamber. The mixing unit is designed to increase residence time for the mixing by suitably arranging the flow paths. The mixing unit can also be designed to promote turbulent mixing and reduce heat losses in the mixing process.

Turbo-charging increases the operating pressure and mass flow in the engine resulting in higher power for a specific engine volume. Turbo charging is not usually done in a spark ignition engine because engine knock occurs with increased pressure and density. Turbo-charging is frequently done with compression ignition or diesel engines to increase performance. Although turbo-charging can increase engine performance, it does not reduce pollution in the exhaust gases.

The primary combustion occurs in the reciprocating engine and is fuel rich, that is, at an equivalence ratio greater that 1.0 to provide a reducing atmosphere to reduce or eliminate NOx formation. The primary combustion exhaust gases will have fuel molecules such as HC, CO and H2 in sufficient amounts such that they can be burned in the combustion chamber of the turbine engine. The secondary combustion occurs at or near stoichiometric conditions at a lower combustion temperature where NOx is difficult to form. The burned gases from the secondary combustion drive a turbine that in turn drives a compressor that supercharges the piston engine and provides compressed air for the secondary combustion. Nitrogen enriched air can be used in the primary or secondary combustion process to better control the combustion temperature and products.

Two-stage combustion with a CI engine can be used to significantly reduce HCs and particles in the a-exhaust with the second burn in the turbine combustion chamber. The residence time in the turbine combustion chamber can be increased and excess air can be added to ensure that all of the HC and particles are burned.

Figure 8:
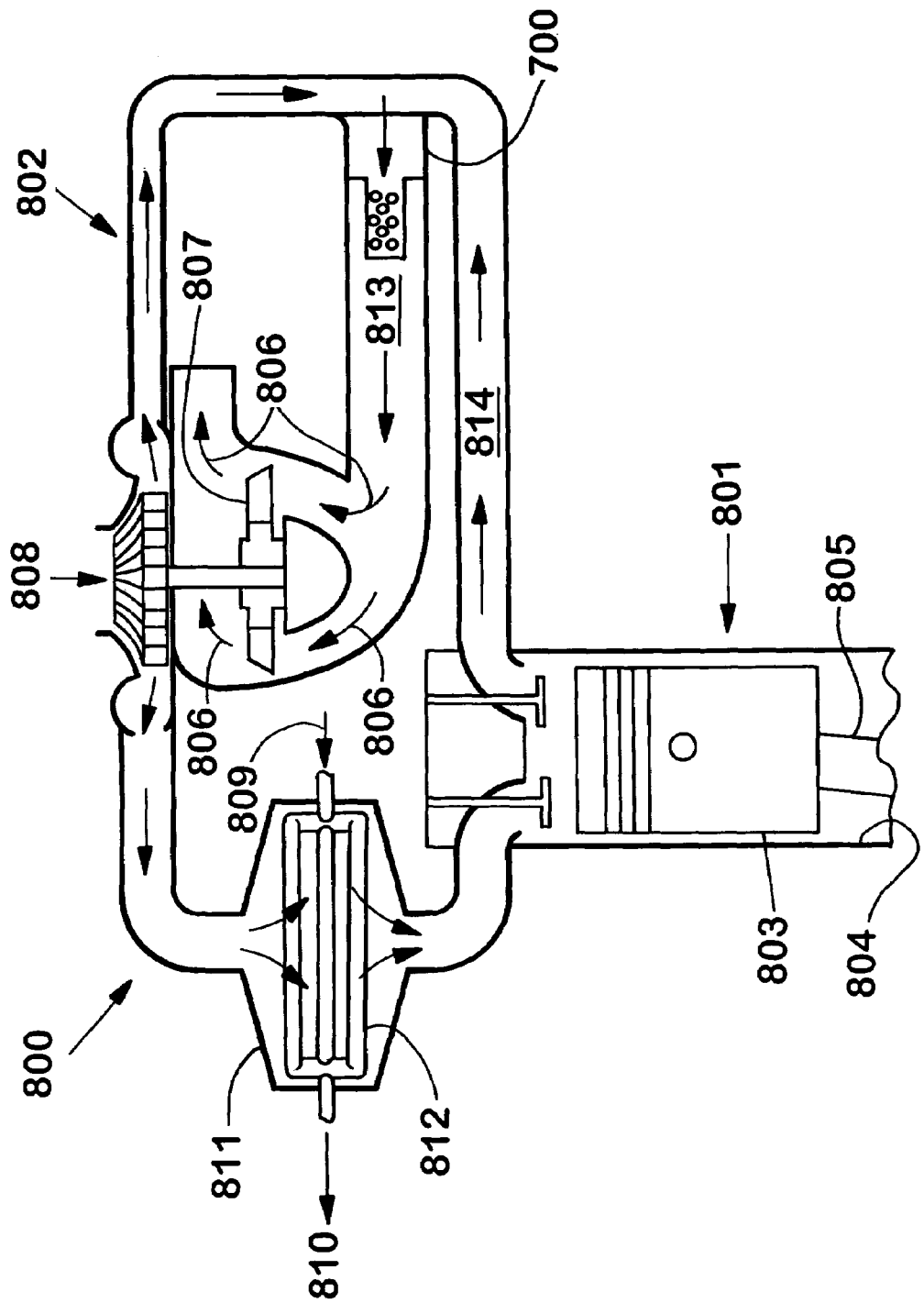
FIG. 8 shows a turbine engine supercharged reciprocating engine with mixing unit.

Referring now to FIG. 8, another embodiment of a combustion method and system is illustrated with a turbine engine supercharger combined with a reciprocating SI or CI engine. This embodiment is designated generally by the reference numeral 800. The piston engine 801 includes a piston 803 in a piston chamber 804 driven by a piston rod 805. The exhaust gases 806 from the piston engine are provided to the turbine engine 802. The turbine engine 802 includes a turbine 807 and an air intake 808. The exhaust gases 806 from the turbine 807 are used to compress the air before it goes into the piston engine 801. Fuel rich exhaust 814 is directed into combustion chamber 813. The compressed air directed is through an intercooler 811 that includes cooling tubes 812 with water 809 directed to the cooling tubes and a water outlet 810. The mixing unit 700 is shown added between the piston engine 801 and turbine engine 802.

The embodiment 800 results in lower pollutant emissions, lower corrosion rates of combustion and heat-transfer equipment, and compatible or improved efficiencies as compared to the typical combustion process used in boilers, burners, turbines, and internal combustion engines. The embodiment 300 involves burning the fuel in two or more stages, where the fuel is combusted fuel-rich with nitrogen-enriched air in the first stage, and the fuel remaining after the first combustion stage is combusted in the remaining stage(s) with air or nitrogen-enriched air. All the combustion stages except the last have a slightly rich fuel/oxidant mixture, and the last stage has the stoichiometric (or near stoichiometric) fuel/ oxidant mixture. The optimum nitrogen concentration range for the nitrogen -enriched air is about 85–89% nitrogen (molar percent), and is adjusted to achieve the desired combustion temperature and reduced corrosion and pollutant levels. This method of burning fuel substantially reduces the oxidant loading (i.e., $O_2$ and O) and pollutant loading (i.e., NO and CO) in the effluent gas, and is applicable to many types of combustion equipment, including: boilers, burners, turbines, internal combustion engines, and many types of fuel including hydrogen and carbon-based fuels. This method of burning fuel, is termed "Staged Combustion with Nitrogen-Enriched Air" or SCNEA.

SCNEA, involves burning fuel in two or more stages in a combustion system, where the fuel is combusted fuel-rich with nitrogen-enriched air in the first stage, and then the fuel remaining after the first combustion stage is burned in the remaining stage(s) with air or nitrogen-enriched air. All the combustion stages, except the last have a slightly rich fuel/oxidant mixture, and the last stage has a stoichiometric (or near stoichiometric) fuel/oxidant mixture. Following each combustion stage, part of the energy from the combustion gases is used to perform work or to provide heat. The equivalency ratio for the first stage of combustion and the nitrogen-enriched air are adjusted to achieve the desired combustion temperature and reduced corrosion and pollutant levels. The equivalency ratio and nitrogen enrichment concentration ranges are respectively typically, phi=1.1–1.5 and 83–88%. This method of burning fuel substantially reduces the oxidant (i.e., $O_2$ and O) and pollutant levels (i.e., NO and CO) in the effluent and, thus, allow higher operational temperatures to maintain or increase the thermal efficiency. This combustion method is applicable to many types of combustion systems, including boilers, burners, turbines, internal combustion engines, and many types of fuel including hydrogen and carbon-based fuels.

Application of SCNEA to a two-stage gas turbine combustion system can be summarized. First, air is enriched in nitrogen using air separation technology and then compressed in a water-cooled compressor to 30 atmospheres. The nitrogen enriched air enters the first stage combustion chamber where it is mixed with fuel and bums fuel rich. The combustion gases exit the combustion chamber and enters a turbine at the combustion temperature of 1700K and the pressure of 30 atmospheres. Work is performed in the turbine by expansion of the gases to a temperature of 780 k and a pressure of 2 atmospheres. The cooled combustion gases enter the second stage where nitrogen-enriched air or air is added to burn the remaining fuel in the second stage. The nitrogen-enriched air or air is supplied by a compressor and heated in a heat exchanger by the second stage exhaust gases.

In a two-stage turbine cycle, the first compressor feed consists of nitrogen-enriched air mixed with the fuel (methane for our example) at 350K and a pressure of one atmosphere. The first compressor compresses the gas mixture to the desired pressure (this compression increases the gas temperature). The mixture is then combusted at a constant pressure. Nitrogen-enriched air is used as the oxidant stream in the first combustion stage to allow precise control of the combustion temperature (and correspondingly the pollutant generation) while producing effluent gases that have a very low oxidant loading. The combustion products at high temperature and an elevated pressure ace expanded to 2.0 atmospheres and work is extracted (this expansion results in a lowering of the gas temperature). Since the first combustion stage is operated fuel-rich (~>1), there is enough fuel remaining in the effluent from the first combustion stage to be flammable when mixed with a stoichometric amount of air (or nitrogen-enriched air). This mixture is combusted at a constant pressure of 2.0 atmospheres in the second combustion stage. The temperature of the second combustion stage is maintained below the temperature of the first combustion stage by controlling the amount of fuel remaining after the first combustion stage. The effluent from the second combustion stage is then expanded to 1.0 atmospheres and work its again extracted.

The thermodynamic cycle of compression-combustion-expansion is the Brayton cycle. For the ideal Brayton cycle, the compression and expansion (turbine) stages are assumed to be adiabatic and isentropic, and the combustion stage is assumed to be isobaric. The efficiency of the Brayton cycle can be increased sometimes by increasing the maximum pressure. However, if the temperature is too low, an increase in pressure can result in a decrease in efficiency.

If the compression ratio is above 15 the temperature should be at least 1400K. The low oxidant loading in the effluent when using the SCNEA method allows both higher temperatures and higher pressures without increasing corrosion rates over those of typical combustion facilities. These allowable increases in temperature and pressure, when using the SCNEA method, lead to higher Brayton cycle efficiencies.

First Compression—The nitrogen-enriched air and methane mixture is input to the compressor at 300K and 1.0 atmosphere. The compressor increases the pressure of the gas mixture to 30 atmospheres, and because the compressor is assumes to be water-cooled, the compressed gas is assumed to exit the compressor at a temperature of 350K.

First Combustion Stage—The methane and nitrogen-enriched air mixture at 30 atmospheres and 350K is input to the first combustion chamber where most of the methane is burned and the temperature is increased to 1700K.

The relative amount of fuel and air in the combustion mixture is described by $\phi$, the ratio of mass fuel to mass air divided by the ratio of mass fuel to mass air for a stoichometric mixture [i.e., (Mass Fuel/Mass Air)/(Mass Fuel/Mass Air)$_2$]. For $\phi>1$ the mixture is fuel-rich and for $\phi<1$ the mixture is fuel-lean.

Figure 9:
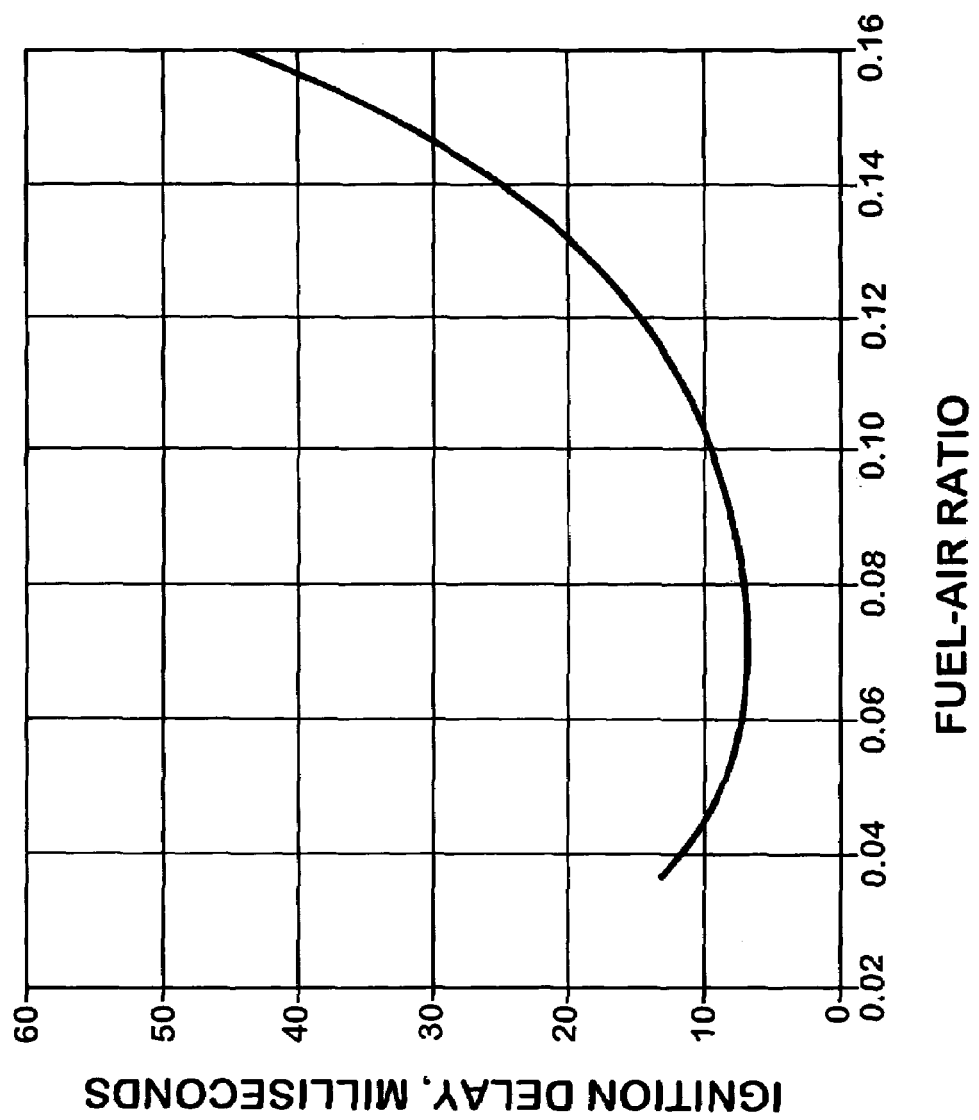
FIG. 9 shows the ignition delay as a function of the fuel-air ratio.

It is important to ensure that the gas mixture anticipated for the first combustion stage is flammable. Two-staged combustion with a SI engine can be used to suppress engine knock by increasing the ignition delay. FIG. 9 shows the ignition delay as a function of the fuel-air ratio. By operating fuel rich in the SI engine the ignition delay is increased and the fuel octane rating can be decreased or the compression ratio increased before knock occurs. The fuel rich exhaust from the SI would be burned in the turbine combustion chamber.

The combustion engine method described herein provides increased fuel efficiency and reduces polluting exhaust emissions by burning fuel in two stages. The method comprises the steps of combusting the fuel in a piston engine in a first stage, the step of combusting the fuel in a piston engine in a first stage producing piston engine exhaust gases, the piston engine exhaust gases containing the fuel, combusting the fuel contained in the piston engine exhaust gases in a second stage turbine engine, the step of combusting the fuel contained in the piston engine exhaust gases in a second stage turbine engine producing turbine engine exhaust gases, and using the turbine engine exhaust gases to supercharge the piston engine. The step of combusting the fuel in a piston engine in a first stage can be in a compression ignition engine, in a piston engine, in a homogenous charged compression ignition engine, or in a variable compression engine, in a nitrogen enriched air combustion engine.

In one embodiment of the invention includes the step of operating the piston engine fuel rich thereby producing a reducing atmosphere and suppressing the formation of NOx. In another embodiment of the invention includes the steps of burning most of the fuel is in the piston engine and maintaining the piston engine exhaust gases sufficiently fuel rich for a second burn in the turbine engine. In another embodiment of the invention the step of combusting the fuel in a piston engine in a first stage comprises combusting the fuel in a compression ignition engine that has heterogeneous combustion resulting in the fuel in the piston engine exhaust gases being at stoichiometric conditions. In another embodiment of the invention the step of combusting the fuel contained in the piston engine exhaust gases in a second stage turbine engine occurs at or near stoichiometric conditions at reduced combustion temperatures where NOx is difficult to form. In another embodiment of the invention the step of using the turbine engine exhaust gases to supercharge the piston engine comprises using the turbine engine exhaust gases to drive a compressor that supercharges the piston engine. In another embodiment of the invention includes using the compressor to provides compressed air to the turbine engine for the step of combusting the fuel contained in the piston engine exhaust gases in a second stage turbine engine. In another embodiment of the invention the piston engine is a compression ignition engine and wherein the residence time of combusting the fuel contained in the piston engine exhaust gases in the turbine engine is increased to ensure that all hydrocarbons and particles are burned. In another embodiment of the invention the piston engine is a compression ignition engine and wherein excess air is added in the turbine engine is increased to ensure that all hydrocarbons and particles are burned. In another embodiment of the invention the piston engine is a spark ignition engine that is operated fuel rich to suppress engine knock. In another embodiment of the invention the step of combusting the fuel in a piston engine in a first stage is combusted with an oxidizer stream. In another embodiment of the invention the oxidizer stream is nitrogen-enriched air. In another embodiment of the invention the step of combusting the fuel contained in the piston engine exhaust gases in a second stage turbine engine stage is combusted with an oxidizer stream. In other embodiments of the invention the fuel is oil, methane, natural gas, ammonia, alcohols and/or ethers, fossil fuels (oil, natural gas, coal, etc.) inorganic fuels (ammonia, hydrazine, calcium, etc.) and/or organic fuels (alcohols, ethers, wood, etc.). In another embodiment of the invention the steps of combusting takes place to perform work. In another embodiment of the invention the steps of combusting takes place to provide heat. In another embodiment of the invention the heat is used for a furnace. In another embodiment of the invention the heat is used for a boiler.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A combustion engine apparatus, comprising:
   fuel, said fuel made up of a first portion and a second portion,
   a first stage piston engine for combusting said first portion of said fuel in a first stage, said first stage piston engine producing piston engine exhaust gases with said piston engine exhaust gases containing said second portion of said fuel;
   a second stage turbine engine for combusting said second portion of said fuel contained in said piston engine exhaust gases in a second stage at stoichiometric conditions, said second stage turbine engine producing turbine engine exhaust gases;
   a supercharger for supercharging said piston engine using said turbine engine exhaust gases, and
   means for directing said turbine exhaust gases from said second stage turbine engine into said supercharger.

2. The combustion engine apparatus of claim 1 wherein said first stage piston engine is a compression ignition engine, a homogenous charged compression ignition engine, a variable compression engine, a nitrogen enriched air combustion engine, a rotating engine, a linear engine, and/or a reciprocating engine.

3. The combustion engine apparatus of claim 1 including a compressor for providing compressed air to said second stage turbine engine for combusting said fuel contained in said piston engine exhaust gases.

4. The combustion engine apparatus of claim 1 wherein said fuel is oil, methane, natural gas, ammonia, alcohols and/or ethers.

5. The combustion engine apparatus of claim 1 wherein said fuel is any combustible matter.

6. The combustion engine apparatus of claim 5 wherein said any combustible matter comprises fossil fuels including oil, natural gas, and/or coal.

7. The combustion engine apparatus of claim 5 wherein said any combustible matter comprises inorganic fuels including ammonia, hydrazine, and/or calcium.

8. The combustion engine apparatus of claim 1 wherein said any combustible matter comprises organic fuels including alcohols, ethers, and/or wood.

* * * * *